(12) United States Patent
Yip et al.

(10) Patent No.: US 12,382,150 B2
(45) Date of Patent: Aug. 5, 2025

(54) METHOD AND APPARATUS FOR TIMED AND EVENT TRIGGERED UPDATES IN SCENE

(71) Applicant: Samsung Electronics Co., Ltd., Suwon-si (KR)

(72) Inventors: Eric Yip, Suwon-si (KR); Hyunkoo Yang, Suwon-si (KR); Sungryeul Rhyu, Suwon-si (KR); Jaeyeon Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 17/721,947

(22) Filed: Apr. 15, 2022

(65) Prior Publication Data
US 2022/0337919 A1     Oct. 20, 2022

(30) Foreign Application Priority Data
Apr. 16, 2021    (KR) ........................ 10-2021-0049969

(51) Int. Cl.
*H04N 21/85*     (2011.01)
*G06T 15/00*     (2011.01)
*G06T 19/00*     (2011.01)
*H04N 21/8545*     (2011.01)
*H04N 21/8547*     (2011.01)

(52) U.S. Cl.
CPC ....... *H04N 21/8547* (2013.01); *G06T 15/005* (2013.01); *G06T 19/006* (2013.01); *H04N 21/8545* (2013.01)

(58) Field of Classification Search
USPC ........................................................ 386/241
See application file for complete search history.

(56) References Cited

U.S. PATENT DOCUMENTS

| | | | |
|---|---|---|---|
| 2019/0087414 A1* | 3/2019 | Narayanan ............ | G06F 16/313 |
| 2019/0303458 A1* | 10/2019 | Hwang ................... | G06F 16/51 |
| 2019/0347518 A1* | 11/2019 | Shrestha ................ | G06N 20/20 |
| 2021/0012578 A1 | 1/2021 | Brimhall et al. | |
| 2021/0049827 A1 | 2/2021 | Lebaredian et al. | |
| 2021/0064774 A1 | 3/2021 | Collart | |
| 2021/0099773 A1* | 4/2021 | Bouazizi ............ | H04N 21/2368 |
| 2021/0105451 A1* | 4/2021 | Oyman ................ | H04N 19/597 |
| 2021/0209829 A1* | 7/2021 | Ilola .................... | H04N 21/8146 |
| 2022/0053216 A1 | 2/2022 | Yip et al. | |

(Continued)

OTHER PUBLICATIONS

International Search report and written opinion dated Aug. 3, 2022, issued in International Application No. PCT/KR2022/005447.

(Continued)

*Primary Examiner* — Nigar Chowdhury
(74) *Attorney, Agent, or Firm* — Jefferson IP Law, LLP

(57) ABSTRACT

The disclosure relates to a method and an apparatus for dynamic scene updates (scenes including timed media) requiring extensions to scene description patch documents supporting timed media. A method for timed and event triggered updates in a scene description for extended reality (XR) multimedia is provided. The method includes parsing a scene description and at least one scene update track sample in a timed scene description update track or at least one scene update item to update the scene description and rendering the updated scene description on a display.

20 Claims, 13 Drawing Sheets

(56) References Cited

U.S. PATENT DOCUMENTS

| | | | | |
|---|---|---|---|---|
| 2023/0205133 A1* | 6/2023 | Matusik | ............... | G03H 1/04 |
| | | | | 359/9 |
| 2023/0206538 A1* | 6/2023 | Jakob | ............... | G06T 15/005 |
| | | | | 345/426 |
| 2023/0209119 A1* | 6/2023 | Jo | ............... | H05B 47/165 |
| | | | | 725/80 |
| 2023/0209294 A1* | 6/2023 | Brodersen | ............... | H04S 7/304 |
| | | | | 381/303 |

OTHER PUBLICATIONS

Lukasz Kondrad, Draft Technologies under Considerations on Scene Description for MPEG Media, XP030295099, Apr. 15, 2021.
ISO/IEC JTC 1/SC 29/WG 03, Potential improvement on ISO/IEC 23090-14 Scene Description for MPEG Media, XP030290089, Jan. 22, 2021.
Intel Corporation, Updated Solution for Dynamic Scene Updates, XP030292957, Oct. 9, 2020.
Kiyama et al., (41.1)[SD] On Random Access Support for Scene Description with Scene Updates, XP030290766, Jan. 6, 2021.
Samsung Electronics, [41.1] On random access support for ISO/IEC 23090-14, XP030295284, Apr. 19, 2021.
ISO/IEC JTC 1/SC 29/WG 03, Exploration Experiment on Dynamic Scene Update, XP030296345, Aug. 9, 2021.
Samsung Electronics, [41.1] On dynamic scene updates in ISO/IEC 23090-14, XP030295292, Apr. 19, 2021.
Extended European Search Report dated Apr. 25, 2024, issued in European Application No. 22788488.9-1207.

\* cited by examiner

METHOD AND APPARATUS FOR TIMED AND EVENT TRIGGERED UPDATES IN SCENE

CROSS-REFERENCE TO RELATED APPLICATION(S)

This application is based on and claims priority under 35 U.S.C. § 119(a) of a Korean patent application number 10-2021-0049969, filed on Apr. 16, 2021, in the Korean Intellectual Property Office, the disclosure of which is incorporated by reference herein in its entirety.

BACKGROUND

1. Field

The disclosure relates to a method and an apparatus for dynamic scene updates (scenes including timed media) requiring extensions to scene description patch documents supporting timed media.

2. Description of Related Art

Recent advances in multimedia include research and development into the capture of multimedia, the storage of such multimedia (formats), the compression of such multimedia (codecs, etc.), as well as the presentation of the such multimedia in the form of new devices which can provide users with more immersive multimedia experiences. With the pursuit of higher resolution for video, e.g., 8K resolution, and the display of such 8K video on ever larger television (TV) displays with immersive technologies such as high dynamic range (HDR), the focus in a lot of multimedia consumption has shifted to a more personalized experience using portable devices such as mobile smartphones and tablets. Another trending branch of immersive multimedia is extended reality (XR). The XR may comprises at least one of virtual reality (VR), augmented reality (AR), and mixed reality (MR). Such VR and AR multimedia typically requires the user to wear a corresponding VR or AR headset, or glasses (e.g., AR glasses), where the user's vision is surrounded by a virtual world (VR), or where the user's vision and surroundings is augmented by multimedia which may or may not be localized into his/her surroundings such that they appear to be a part of the real world surroundings.

A big challenge in VR and AR is the production of multimedia contents for such immersive experiences. Whilst the production of animations and artificial contents (such as graphics in a game, etc.) is available, for a more immersive experience, the high quality capture of real life objects (a three-dimensional (3D) capture equivalent to that of a two-dimensional (2D) video captured by a camera) and scenes is something which can provide a truly immersive experience for VR and AR.

Likewise with artificially created contents, with the capture of real life objects and scenes, typically a scene description is required in order to describe the scene for which the contents are attempting to represent.

A scene description is typically represented by a scene graph, in a format such as graphics language (GL) transmission format (glTF) or universal scene description (USD). A scene graph describes the objects in a scene, including their various properties, such as location, texture(s), and other information. A glTF scene graph expresses this information as a set of nodes which can be represented as a node graph. The exact format used for glTF is the JavaScript object notation (JSON) format, meaning that a glTF file is stored as a JSON document.

The above information is presented as background information only to assist with an understanding of the disclosure. No determination has been made, and no assertion is made, as to whether any of the above might be applicable as prior art with regard to the disclosure.

SUMMARY

Although scene descriptions/scene graphs such as graphic language (GL) transmission format (glTF) are well defined to support static scenes and scenes containing animations, etc., as-is, glTF requires extensions to support timed media such as those defined by moving picture experts group (MPEG) standards. Such MPEG media may include compressed video and audio (by MPEG standard codecs such as advanced video coding (AVC), or high efficiency video coding (HEVC) etc.), and also the more recently standardized technologies such as compressed point clouds, either through video based point cloud compression (V-PCC), geometry based point cloud compression (G-PCC), or any other similar immersive media.

By extensions of the glTF to support such timed media, it is possible to achieve a dynamic scene description. Existing static scenes can be updated using JavaScript object notation (JSON) patch documents, but when and in what manner to update the scene using such documents is unspecified, and can only be known by the content creator since a static scene does not contain any principals of presentation time or timelines.

As such, current scene graphs (namely glTF) cannot support dynamic scenes containing timed media, specifically the update of dynamic scenes based on a defined presentation time for the scene, as well as based on various events happening in the scene which are dependent on the user's interaction.

Aspects of the disclosure are to address at least the above-mentioned problems and/or disadvantages and to provide at least the advantages described below. Accordingly, an aspect of the disclosure is to provide an apparatus and method for timed and event triggered updates in a scene description for extended reality (XR) multimedia.

Additional aspects will be set forth in part in the description which follows and, in part, will be apparent from the description, or may be learned by practice of the presented embodiments.

In order to support dynamic scenes which can be updated according to some presentation timeline, or some event which is triggered from user interaction, glTF documents must be referenced to some presentation timeline, and its corresponding scene updates must be enabled via either related time or event mechanisms.

The embodiments in this disclosure enables the time triggered update of dynamic scenes by storing the JSON patch update documents in a timed metadata track as defined by the international organization for standardization (ISO) and the international electrotechnical commission (IEC) (ISO/IEC) base media file format (ISOBMFF). In addition, these JSON patch update documents stored as track samples may contain additional metadata which enable the time triggered updates (and their restrictions/conditions). JSON patch update documents which are triggered according to events (user interaction) can also be defined with such equivalent additional metadata, and may be stored either as samples within a timed metadata track, or as individual items without presentation times. Since scene updates (through JSON patch update documents) are defined according to some presentation time, the concept of random access into the scene at a given timestamp is also considered in the embodiments. Such data which might be required for random access might include the original version scene description document, subsequent increment update patch documents, or a complete scene description document at the time specified by the random access time location.

In accordance with an aspect of the disclosure, a method for timed and event triggered updates in a scene description for extended reality (XR) multimedia is provided. The method includes parsing a scene description and at least one scene update track sample in a timed scene description update track or at least one scene update item to update the scene description and rendering the updated scene description on a display.

The following is enabled by the embodiments in this disclosure:
Support for dynamic scene updates with support for (MPEG) timed media
Dynamic scene updates which are triggered through:
Time (coordinated universal time (UTC)/international atomic time (TAI) time, or content referenced presentation time)
Events (user interaction)
For each of the dynamic scene update triggers, there may be additional conditions related to scene description version, post-event operations, etc.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
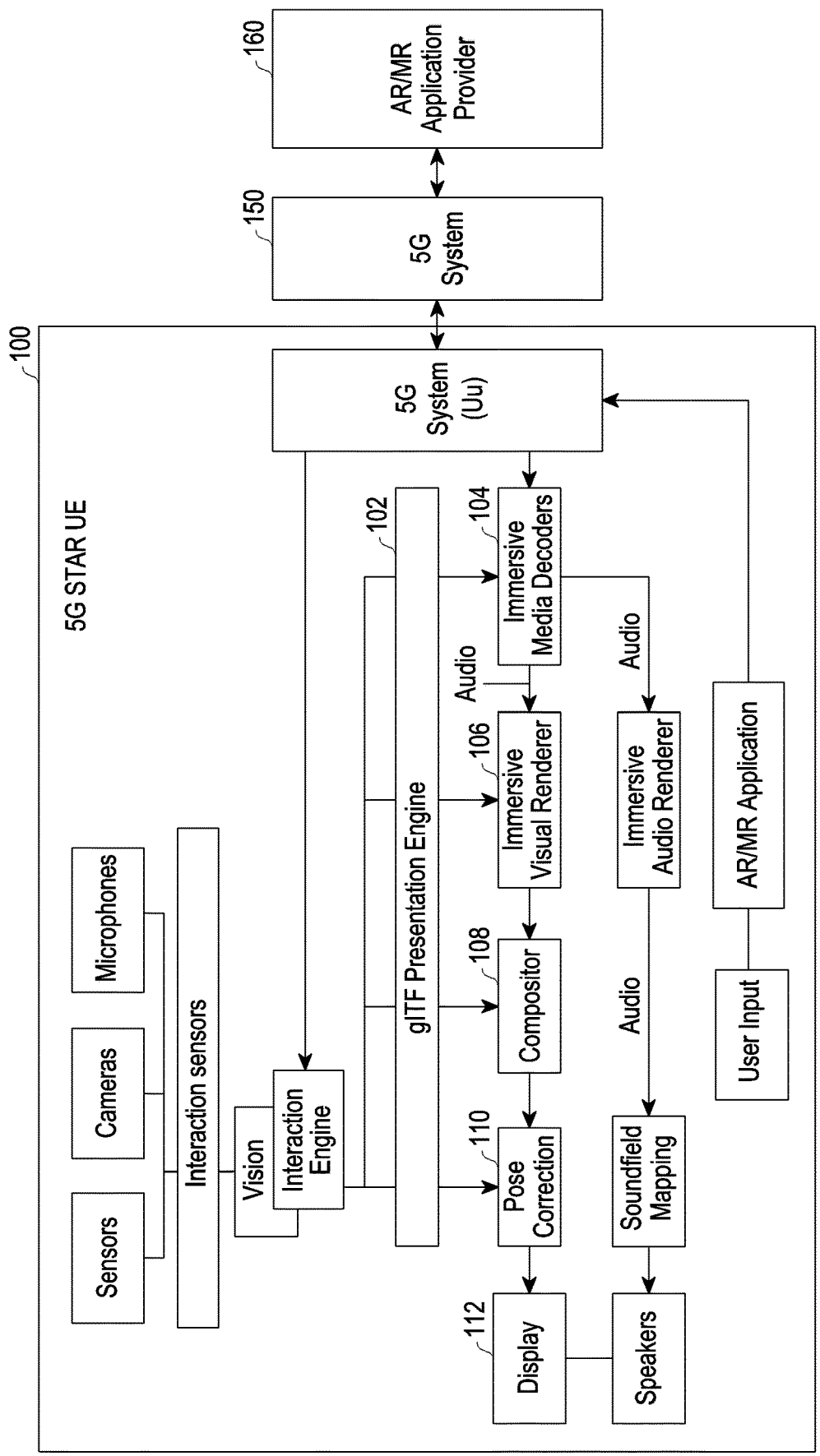
FIG. 1 shows a block diagram of a 5th generation (5G) user equipment (UE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure may relate to multimedia content processing authoring, pre-processing, post-processing, metadata delivery, delivery, decoding and rendering of, virtual reality, mixed reality and augmented reality contents, including two dimensional (2D) video, 360 video, three dimensional (3D) media represented by point clouds and/or meshes. The disclosure may also relate to scene descriptions, dynamic scene descriptions, dynamic scene descriptions supporting timed media, scene description formats, and/or graphic language (GL) transmission format (glTF). The disclosure may also relate to moving picture experts group (MPEG) media, and/or the international organization for standardization (ISO) and the international electrotechnical commission (IEC) (ISO/IEC) base media file format (ISOBMFF) file format. The disclosure may also relate to virtual reality (VR) devices, and/or extended reality (XR) devices. The disclosure may also relate to support of immersive contents and/or media. The disclosure may also relate to dynamic scene updates based on time (e.g., coordinated universal time (UTC) or international atomic time (TAI)), presentation time, or events (possibly triggered by user interactions).

The disclosure may relate to:
Support for dynamic scene updates: timed updates, or event (user interaction) triggered updates
   Required information (metadata) in order to support dynamic scene updates with timed media
   1. Timed scene updates: scene description version and time conditions
      Scene update documents stored in timed-metadata tracks
      Scene random access support
   2. Event (user interaction) scene updates: conditions, post-event operations
      Conditions:
      Scene version of current scene
      Presentation time and/or event period
      Post-event operations:
      New scene: new scene version playout
      Return: return to previous scene version (defining media presentation time within the version)
      Skip: skip to arbitrary scene version (defining media presentation time within the version)
      How and where to store these event scene update related data (JavaScript object notation (JSON) update patch document items or samples)

FIG. 1 shows a block diagram of a 5$^{th}$ generation (5G) user equipment (UE) according to an embodiment of the disclosure.

Referring to FIG. 1, the 5G UE 100 (e.g., a 5G satellite and cellular (STAR) UE) may connect 5G system 150 via a Uu interface, and receive augmented reality (AR), and mixed reality (MR) (AR/MR) service from an AR/MR application provider 160. The 5G UE 100 may comprise a scene graph presentation engine (e.g., a glTF presentation engine 102). The scene graph presentation engine 102 may parse an initial scene description represented by a scene graph, in a format such as glTF, and scene update track samples, and create the updated scene description. In one embodiment, scene description samples and event scene update sample are also considered for the updated scene description. The updated scene description may be used in immersive media decoders 104, an immersive visual renderer 106, a compositor 108, and pose correction module 110 to display the AR/MR video on a display 112.

Figure 2:
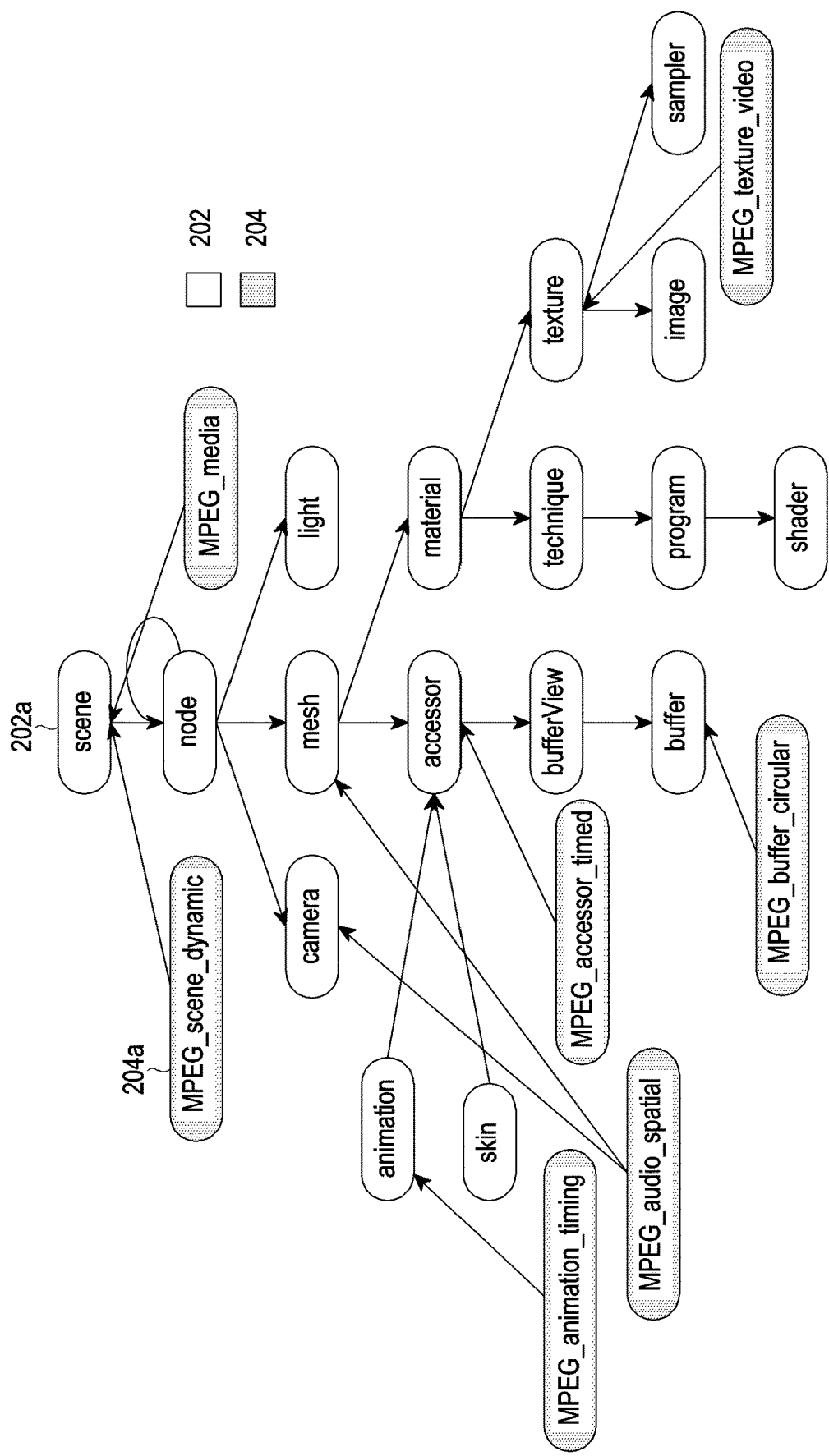
FIG. 2 shows an example of a scene description (e.g., graphic language (GL) transmission format (glTF)) represented by a node tree according to an embodiment of the disclosure.

FIG. 2 shows an example of a scene description (e.g., glTF) represented by a node tree according to an embodiment of the disclosure.

Referring to FIG. 2, first nodes 202 (including at least one of: scene 202a, node, camera, mesh, light, accessor, animation, skin, bufferView, buffer, material, technique, program, shader, texture, image, and/or sample) represent those which are readily defined in scene graphs, whilst second nodes 204 (including at least one of: MPEG_scene_dynamic 204a, MPEG_media, MPEG_animation_timing, MPEG_accessor_timed, MPEG_audio_spatial, MPEG_buffer_circular, MPEG_texture_video) indicate the extensions which are defined in order to support timed media (e.g., MPEG).

Figure 3:
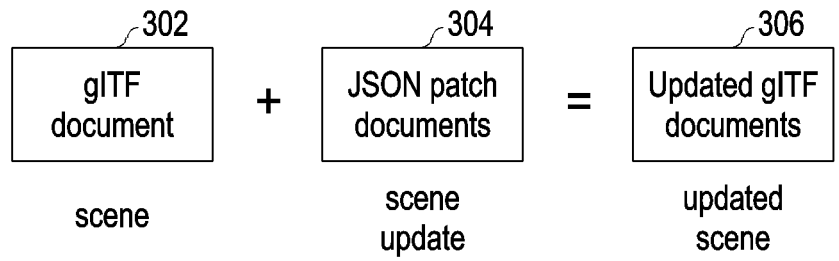
FIG. 3 shows how a scene graph (e.g., represented by a glTF JavaScript object notation (JSON) document) can be updated through the use of an update file according to an embodiment of the disclosure.

FIG. 3 shows how a scene graph (e.g., represented by a glTF (JSON) document 302) may be updated through the use of an update file (e.g., a JSON Patch 304, as defined in RFC 6902) according to an embodiment of the disclosure.

It is noted that the update file (e.g., a JSON Patch document 304) may contain information required for the update, and not the entire scene graph; as such, each update file (e.g., JSON Patch 304) is only an incremental update for a specific scene graph version (e.g., glTF document). The updated glTF document 306 may comprise updated scene based on a scene of the glTF document 302 and the scene update of the JSON patch document 304.

Figure 4:
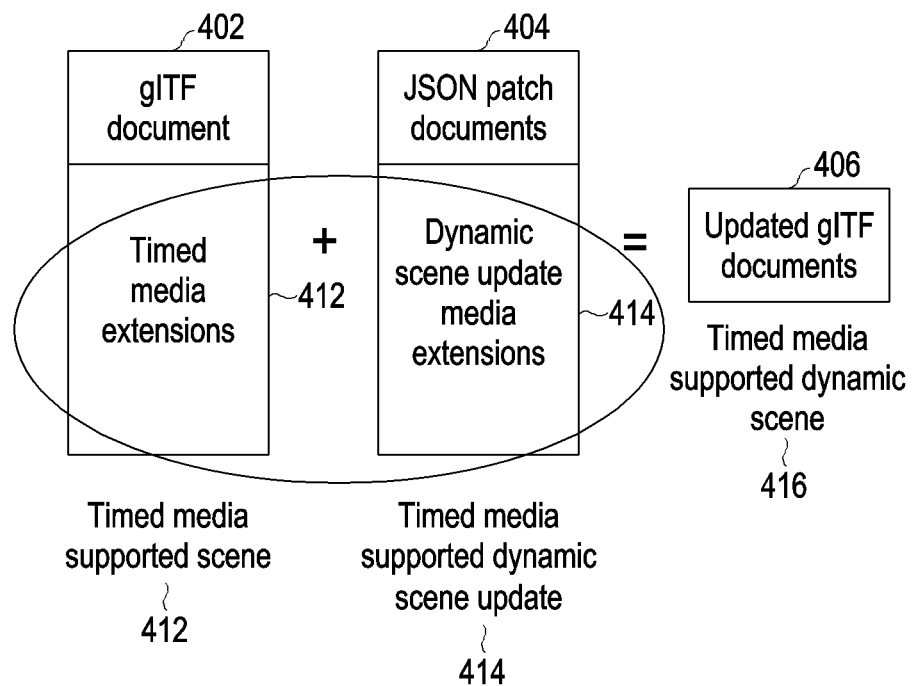
FIG. 4 shows extensions for the scene description and the scene update according to an embodiment of the disclosure.

FIG. 4 shows extensions for the scene description and the scene update according to an embodiment of the disclosure.

Referring to FIG. 4, the updated glTF document 406 may comprise timed media supported dynamic scene 416 based on a timed media supported scene of the glTF document 402 and the timed media supported dynamic scene update of the JSON patch document 404. with such extensions (e.g., an extension defining metadata for the scene description (e.g., glTF JSON documents), timed media may be supported in a scene (e.g., the timed media extensions 412 attached to the glTF document 402 shown by the left column); in addition such scenes may also be updated with update documents (e.g., JSON patch documents) which are also extended with certain metadata (e.g., the dynamic scene update media extensions 414 attached to the JSON patch documents 404 as shown by the right column). As such, timed media supported scene updates may be used to achieve a timed media supported dynamic scene triggered either through time in the presentation, or by user interaction events during the presentation.

Figure 5:
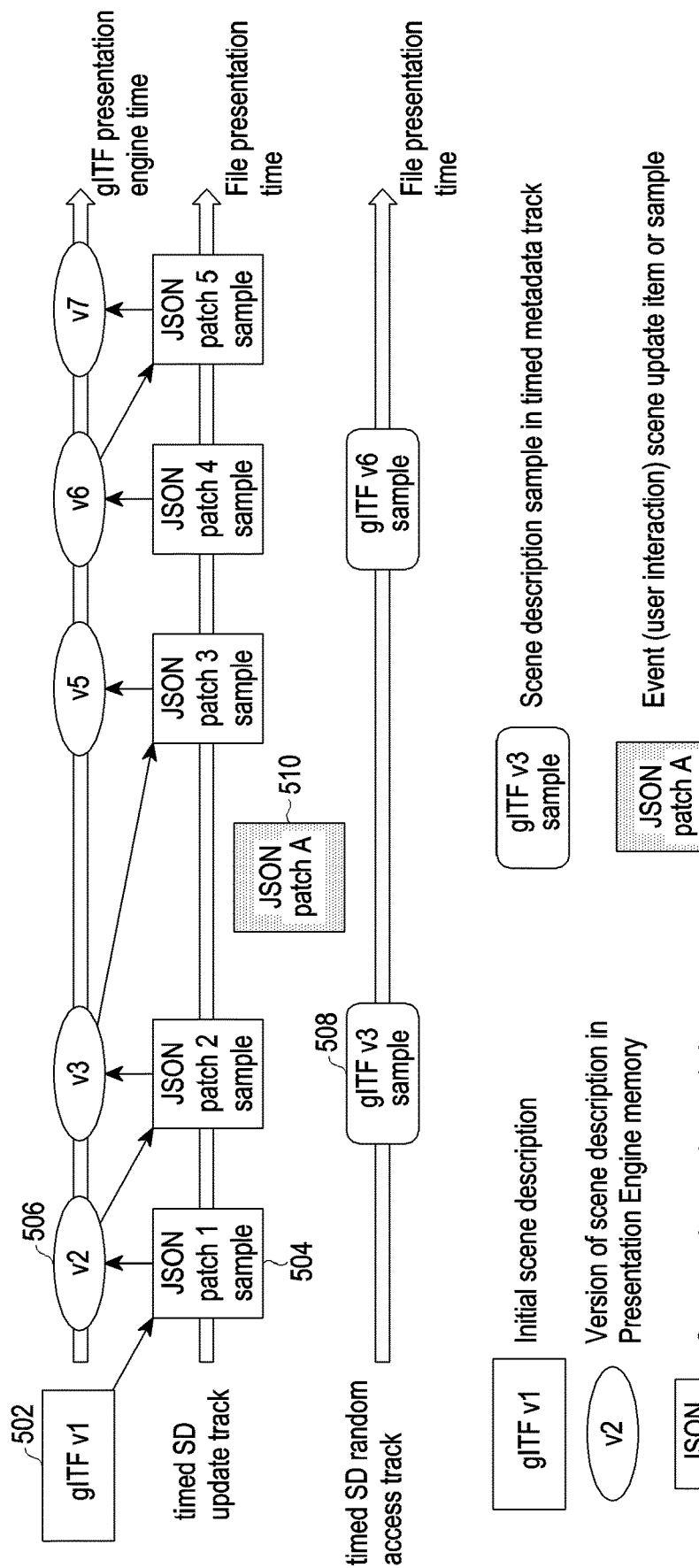
FIG. 5 shows the possible data components regarding updates to a scene description to create a dynamic scene according to an embodiment of the disclosure.

FIG. 5 shows the possible data components regarding updates to a scene description to create a dynamic scene according to an embodiment of the disclosure.

"glTF v1"

The initial scene description (e.g., glTF v1 502) represented by an initial scene graph in the form of a file of document (shown as glTF v1 in FIG. 5) may be present, and may be the initial scene graph which represents the scene at the beginning of the immersive scene experience. This is v1 scene graph (e.g., glTF v1 502) may be parsed and used by the presentation engine in order to rendering the scene.

"JSON Patch 1 Sample"

A separate timed scene description update track (in the form of e.g., an ISOBMFF timed-metadata track) may be also present, and may consist of scene update track samples (e.g., JSON patch 1 sample 504, JSON patch 2 sample, JSON patch 3 sample, JSON patch 4 sample, or JSON patch 5 sample in timed scene description (SD) update track shown in FIG. 5). These scene update track samples each may contain at least one of:
   The data for the scene graph update (e.g., a JSON Patch or at least one JSON patch sample)
   Metadata related to the scene graph update describing operations, and/or conditions related to the update (reference metadata defined in at least one of FIGS. 6 to 13)
   A timestamp for the sample, according to the presentation timeline of the timed-metadata track In one embodiment, the scene graph update is also possible using scene update items, which are not stored in a timed metadata track. The scene update items each may contain at least one of: the data for the scene graph update (e.g., a JSON Patch), and the metadata related to the scene graph update.

"v2"

Once a scene graph with is updated using a scene graph update file or form, a new updated scene graph with a different identifier exists in the scene graph presentation engine memory, as depicted by v2 (e.g., gltf v2 506), v3, v5, v6, or v7 in FIG. 5.

"glTF v3 Sample"

A separate timed metadata track containing complete scene graph samples (shown as glTF v3 sample 508 and glTF v6 sample in FIG. 5) may be used for random access into the dynamic scene content by the scene player. These scene graph track samples (e.g., glTF v3 sample 508) each may contain at least one of:

The data for the scene graph (e.g., a glTF document)

Metadata related to the scene graph describing its version number through an identified or some other method, and/or conditions of its presentation time (reference metadata defined in at least one of FIGS. 6 to 13)

A timestamp for the sample, according to the presentation timeline of the timed-metadata track "JSON Patch A"

Event (user interaction) scene update sample (or item) (e.g., JSON patch A 510) may comprises scene graph update data related to events which are triggered by user interactions, and may also be used to update the scene graph in the scene presentation engine at a given time, according to the constraints placed on the event scene update data. Timed scene update data may be stored as track samples in a timed metadata track or as items. Such event scene updates may be stored as either an item (without explicit presentation time restrictions), or as samples in a track (with explicit presentation time restrictions). In one embodiment, event scene update data may be stored either: 1) as items e.g., a list of items in an ISOBMFF box (not as track samples in a timed metadata track); or 2) as track samples in a timed metadata track. Event linked scene graph update data (items or samples) may contain additional metadata such as those defined in one of FIGS. 3 to 13, related to event conditions and post-event operations.

Figure 6:
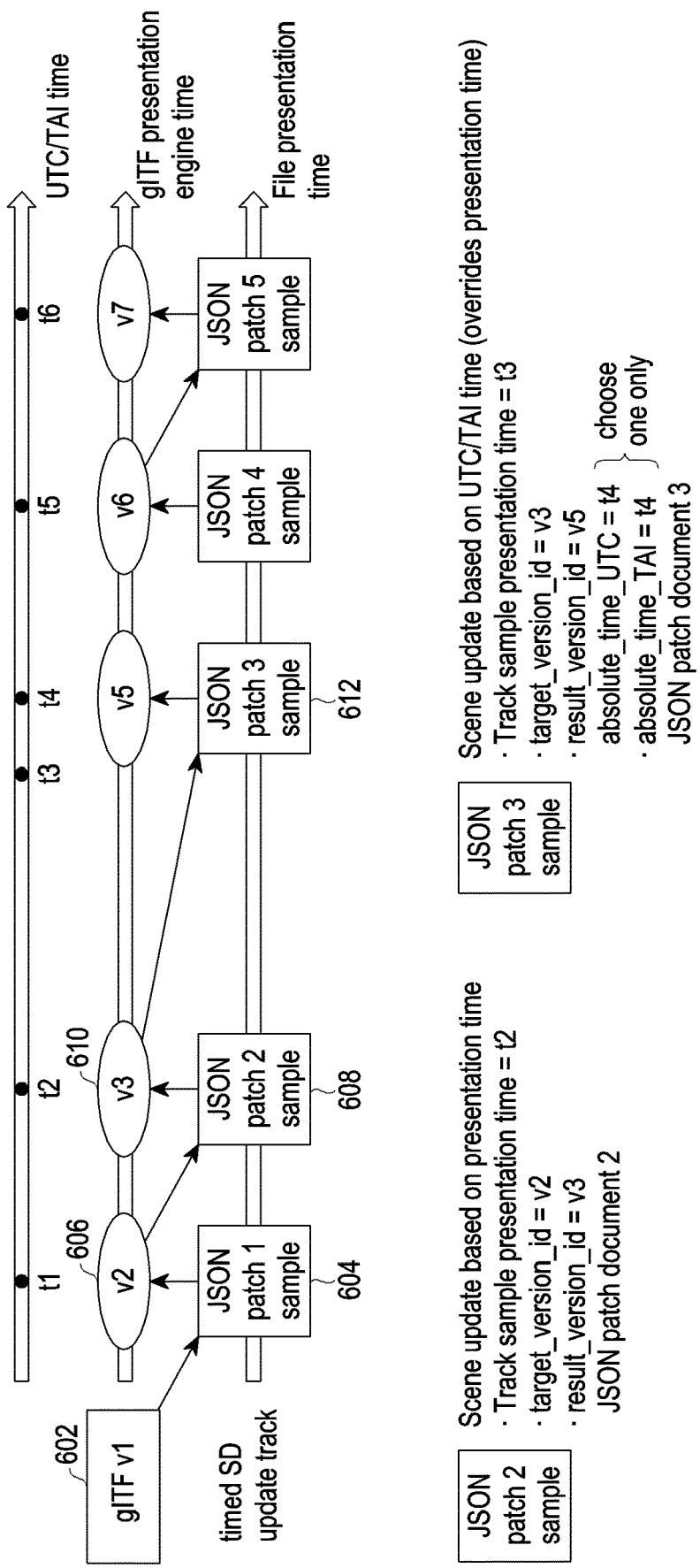
FIG. 6 shows scenarios of scene graph updates which are based on presentation and/or real world coordinated universal time (UTC)/international atomic time (TAI) time conditions according to an embodiment of the disclosure.

FIG. 6 shows scenarios of scene graph updates which are based on presentation and/or real world UTC/TAI time conditions according to an embodiment of the disclosure.

Scene Update Based on Scene Update Sample Presentation Time

The initial scene graph input into the scene presentation engine (memory) may be specified as scene graph v1 (e.g., glTF v1 602).

When scene update sample 1 (e.g., JSON patch 1 sample 604) may be parsed from the timed metadata track and executed to update scene graph v1 at time t1, the scene graph in the scene presentation engine may be updated to become scene graph v2.

Likewise, scene graph v2 606 may be updated to scene graph v3 610 at t2 using scene update sample 2.

In order to enable the operations above, the following metadata may be attached to a scene update sample (e.g., JSON patch 2 sample 608) (in addition to the actual scene update data):

Track sample presentation time

Presentation time of the scene update data stored as a scene update sample inside the timed metadata track target_version_id Identifier for the version of the target scene description for which the dynamic scene update is applicable result_version_id Identifier for the version of the resulting scene description when the dynamic scene update is applied Scene Update Based on UTC/TAI Time (Overrides Presentation Time)

As shown in FIG. 5, when the current scene graph version is v3 (e.g., glTF v3 610), and the scene update sample v3 (e.g., JSON patch 3 sample 612) may be parsed at presentation time t3, it may not be processed by the scene presentation engine at the same time instance, but instead only be executed (and thus the scene graph updated) at time t4

In this scenario, the time for the execution of the scene update is specified according to a UTC/TAI time, and overrides the time which is specified by the track sample presentation time. If, at the playback of the dynamic scene, the specified UTC/TAI time has already passed, then this override operation may not take place, and the presentation time may be used for the scene update In order to enable the operations above, the following metadata may be attached to the scene update sample (e.g., JSON patch 3 sample 612) (in addition to the actual scene update data):

Track sample presentation time

Presentation time of the scene update data stored as a scene update sample inside the timed metadata track target_version_id Identifier for the version of the target scene description for which the dynamic scene update is applicable result_version_id Identifier for the version of the resulting scene description when the dynamic scene update is applied absolute_time_UTC Wall clock time identifying the execution time of the scene update transaction on the scene graph (glTF object). The value may be denoted in UTC absolute_time_TAI Wall clock time identifying the execution time of the scene update transaction on the scene graph (glTF object). The value may be denoted in TAI The offset between a scene update sample's presentation time (as specified by the sample presentation timestamp) and its specified execution time may enable the advanced parsing of scene update samples (data), which may be defined to take into account the execution processing delays (e.g., when the scene update is very significant and computationally heavy) in order to achieve synchronization with UTC/TAI sensitive applications.

Alternatively, this offset can be specified by signaling an execution time referenced to the presentation timeline, or by signaling an explicit offset value (that is defined as an offset from the sample presentation time):

execution_time

Figure 7:
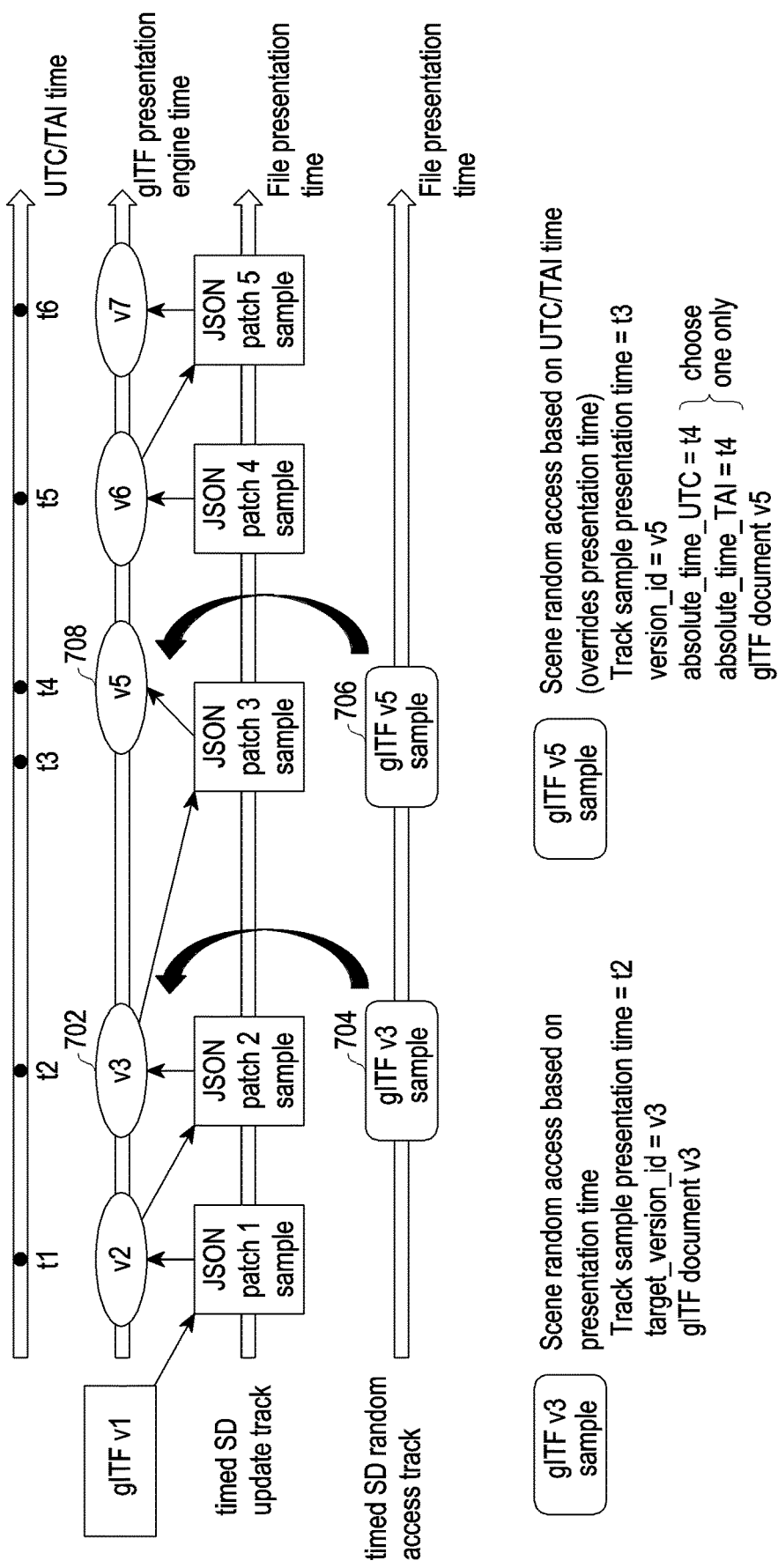
FIG. 7 shows scenarios of dynamic scene graph random access, either based on track presentation time, or based of a specified UTC/TAI time according to an embodiment of the disclosure.

Time identifying the execution time of the scene update transaction on the scene graph (glTF object), referenced to the track presentation timeline execution_time_offset Time offset for the execution time of the scene update transaction on the scene graph (glTF object), calculated from the track sample presentation timestamp FIG. 7 shows scenarios of dynamic scene graph random access, either based on track presentation time, or based of a specified UTC/TAI time according to an embodiment of the disclosure.

Referring to FIG. 7, a timed metadata track (e.g., timed SD random access track) containing scene graph samples (e.g., glTF v3 sample 704) can be used for random access when a user wants to skip to a certain point in time in the scene using trick play.

Scene Random Access Based on Presentation Time

The user or scene player may specify a scene presentation time for playback through trick play (t2).

The scene graph sample closest to the specified trick play time (in the random access track, according to track presentation time) is identified and parsed (e.g., scene graph v3 702 [glTF v3 sample 704]).

The scene player executes the scene graph (e.g., the scene graph v3 702) in the presentation engine, noting its version identifier (v3).

In order to enable the operations above, the following metadata (including attributes) may be attached to the (random access) scene graph sample (e.g., glTF v3 sample 704) (in addition to the actual scene graph data):

Track sample presentation time
  Presentation time of the scene graph data stored as a (random access) scene graph sample inside the timed metadata track
version_id (or target_version_id)
  Identifier for the version of the scene description (graph) contained inside the sample Scene Random Access Based on UTC/TAI Time (Overrides Presentation Time)

As shown by scene graph sample v5 (e.g., glTF v5 sample 706), if a specific UTC/TAI time is specified for the scene graph's execution (playback), it may override the presentation time specified by the sample:

The user or scene player may specify a scene presentation time for playback through trick play (t3).

The scene graph sample closest to the specified trick play time (in the random access track, according to track presentation time) is identified and parsed (e.g., scene graph v5 708 [glTF v5 sample 706]).

The scene player only executes the scene graph in the presentation engine at time t4, as specified in the metadata provided with the sample.

In order to enable the operations above, the following metadata (including attributes) may be attached to the (random access) scene graph sample (e.g., glTF v5 sample 706) (in addition to the actual scene graph data):

Track sample presentation time
  Presentation time of the scene graph data stored as a (random access) scene graph sample inside the timed metadata track
version_id
  Identifier for the version of the scene description (graph) contained inside the sample
absolute_time_UTC
  Wall clock time identifying the execution time (and thus playback) of the scene graph (glTF object). The value is denoted in UTC
absolute_time_TAI
  Wall clock time identifying the execution time (and thus playback) of the scene graph (glTF object). The value is denoted in TAI The offset between a scene graph sample's presentation time (as specified by the sample presentation timestamp) and its specified execution time (playback time) may enable the advanced parsing of the scene graph samples (data), which can be defined to take into account the execution processing delays (e.g., when loading a complex scene) in order to achieve synchronization with UTC/TAI sensitive applications.

Figure 8:
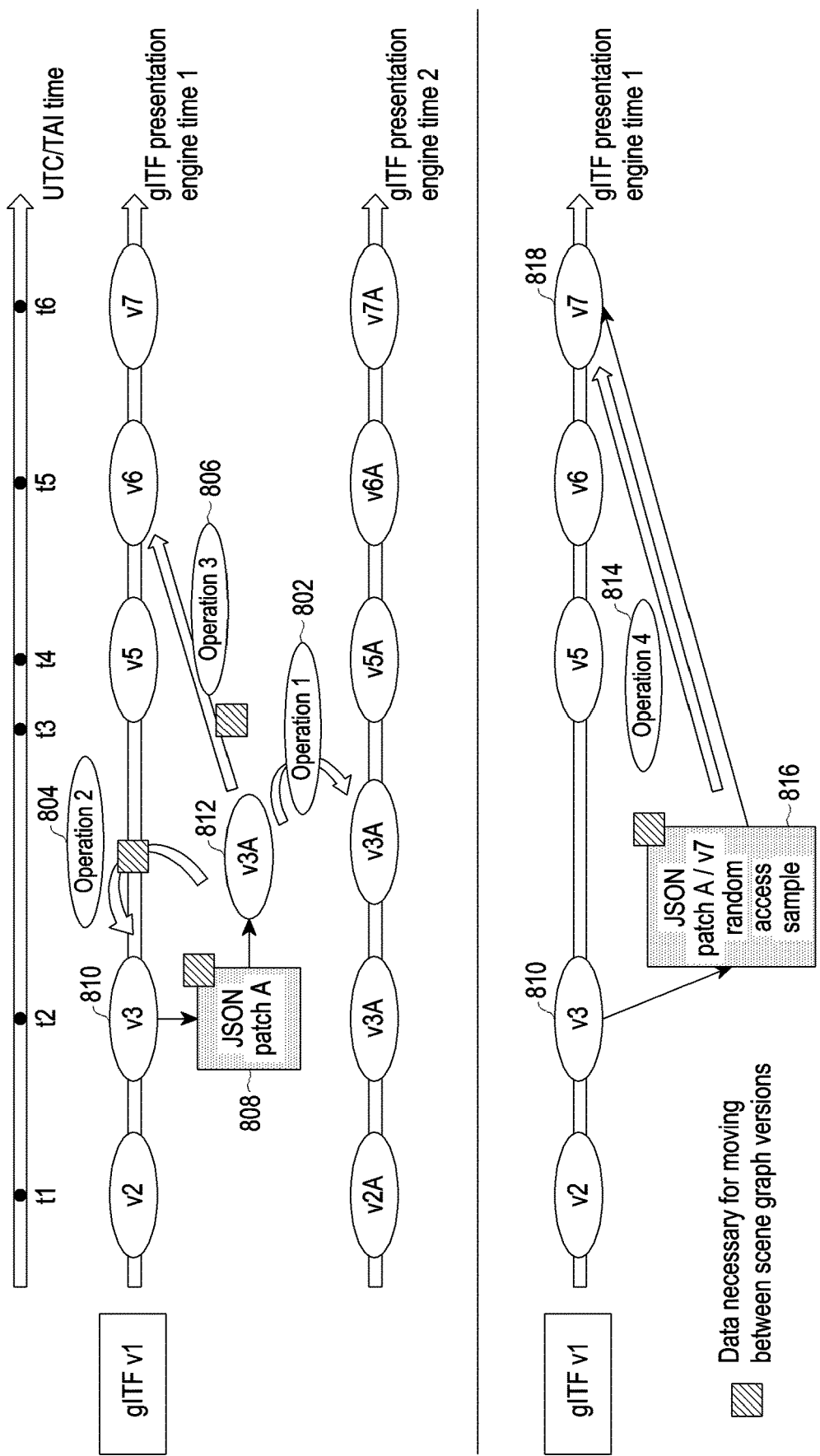
FIG. 8 shows the different operations resulting from an event (user interaction) triggered scene update according to an embodiment of the disclosure.

Alternatively, this offset can be specified by signaling an execution time (playback time) referenced to the track presentation timeline, or by signaling an explicit offset value (that is defined as an offset from the sample presentation time):

execution_time
  Time identifying the execution time (playback time, loading) of the scene graph (glTF object), referenced to the track presentation timeline
execution_time_offset
  Time offset for the execution time (playback time, loading) of the scene graph (glTF object), calculated from the track sample presentation timestamp FIG. 8 shows the different operations resulting from an event (user interaction) triggered scene update according to an embodiment of the disclosure.

Referring to FIG. 8, operation 1 (802), operation 2 (804), and operation 3 (806) may be based on event scene updates which, as shown in FIG. 8, are achieved by executing scene graph update A (e.g., JSON patch A 808). The data of scene graph update A may be stored as either an item, or a track sample (discussed later). Once an event identified with this scene graph update A data is triggered (e.g., through a user interaction), the current scene graph (e.g., glTF v3 810) in the scene presentation engine (v3) is updated to a scene graph v3A 812, where its resulting version (v3A) is specified. Since target and result version identifiers can be attached to the event scene update data, conditions on its applicability can be explicitly defined (also in the time domain). After the scene graph in the scene presentation engine (memory) is updated to v3A 812 (the scene triggered by the event), scene graph version v3A 812 will playout accordingly. Since scene graph v3A 812 was an event triggered dynamic scene, after its playout (e.g., after the contents due to the event are presented and have finished playback), at least one of following operations 802, 804, 806, and 814 may be executed, depending on the type of event scene update that was triggered/applied:

Operation 1 (802): Keep/Retain Event Updated Scene Graph Version after Event Playout After the playout of the event scene graph update (e.g., end of scene graph v3A playout), the scene presentation engine continues to retain the scene graph of the event, in its memory, e.g., version v3A in FIG. 8. Further dynamic scene updates may happen depending on whether there are further timed scene updates continuing from this version (but this is irrelevant to the event scene update).

Operation 2 (804): Return to Previous Scene Graph Version after Event Playout After the playout of the event scene graph update (e.g., end of scene graph v3A playout), the scene presentation engine returns the scene graph in its memory to the scene graph version before the occurrence of the event. As shown in FIG. 8, operation 2 returns the scene graph v3A to v3 after the playout of v3A. The presentation engine may calculate the differential data used when executing the event update (JSON patch A), or use any other explicitly available data in order to return to this previous scene graph version. Since scene graph v3 also contains timed media inside the scene, the exact return point presentation time within scene graph v3 can also be specified explicitly (e.g., by return_time and/or goto_time).

Operation 3 (806): Skip to a Different Scene Graph Version after Event Playout After the playout of the event scene graph update (e.g., end of scene graph v3A playout), the scene presentation engine skips to a different scene graph version (e.g., v6 as shown in FIG. 8), which can be specified explicitly by a version identifier, or by an exact presentation time for random access. This skip in scene graph version in the scene presentation engine's memory can be achieved through an execution of the random access scene graph sample for the version specified, or at the version's presentation time. Similar to operation 2, since scene graph v6 also contains timed media inside the scene, the exact return point presentation time within scene graph v6 can also be specified explicitly (e.g., by return_time and/or goto_time).

Operation 4 (814): Skip to a Different Scene Graph Version without Intermediate Event Playout Operation 4 (814) is somewhat different from operations 1, 2 and 3, in that an event (user interaction) for this scenario triggers a direct skip in the scene presentation timeline, without any separate intermediate event playout scene graph. Here an event triggers the scene graph v3 to be skipped to scene graph v7 818, which is a scene graph version at a later time in the scene presentation timeline. This event operation 4 (814) may utilize either a specific scene graph update data 816 (to update scene graph v3 to v7), or a random access sample 816 of the skip to scene graph version (e.g., random access sample of scene graph v7 818).

Figure 9:
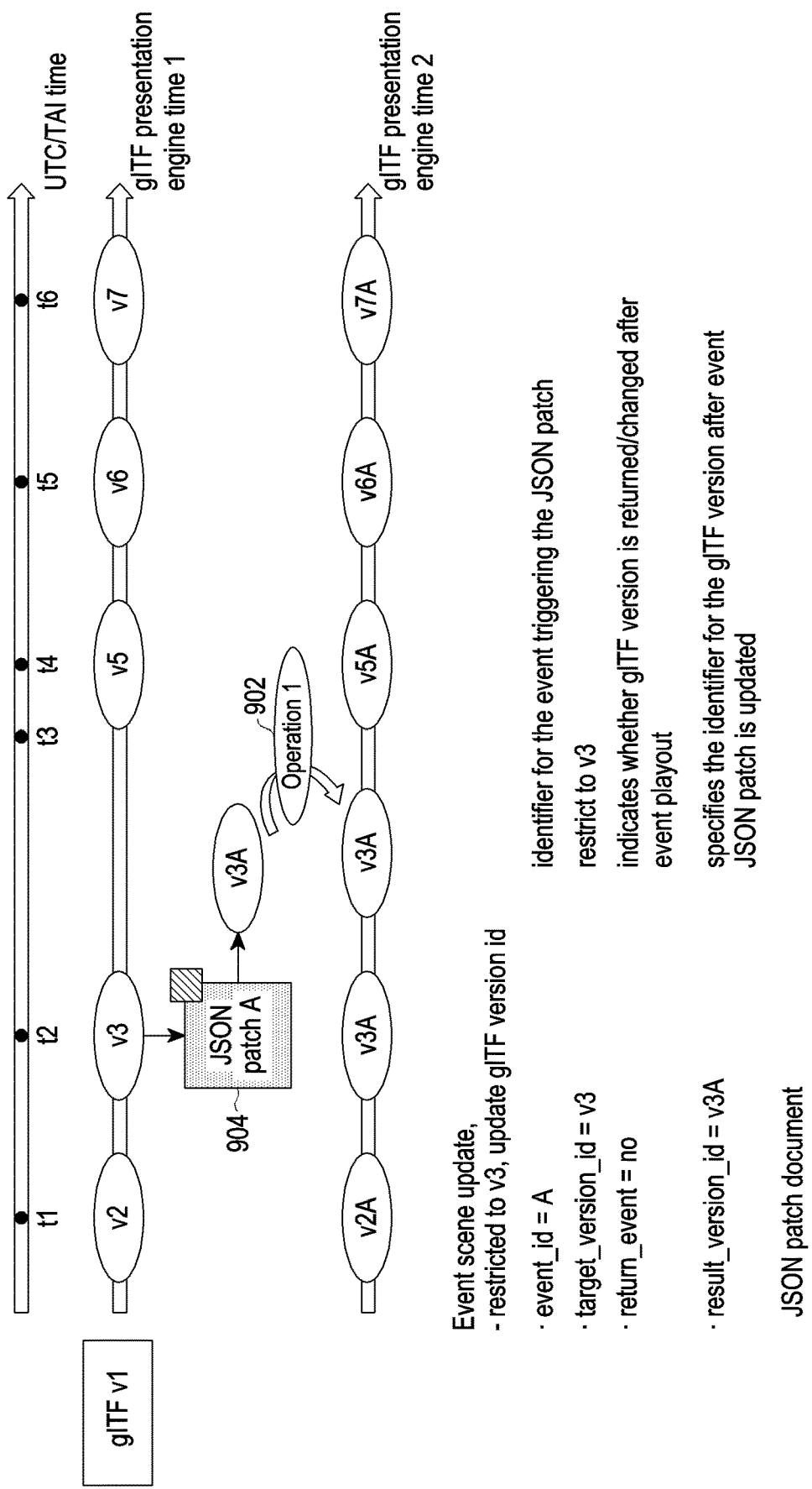
FIG. 9 shows an example of the required metadata (attributes) for the event scene update for operation 1 according to an embodiment of the disclosure.

FIG. 9 shows an example of the required metadata (attributes) for the event scene update for operation 1 according to an embodiment of the disclosure.

Referring to FIG. 9, to indicate the operation 1 (902) (e.g., operation 1 (802)), the following metadata (including attributes) may be attached to the event scene update data (e.g., JSON patch A 904 in FIG. 9). Multiple sets of the following metadata (including attributes) may be present for a single copy of the event scene update data in order to avoid redundancy of the update data (i.e., JSON Patch A 904).

event_id
    Identifier for the event triggering the dynamic scene update (e.g., triggering the JSON Patch A 902)

target_version_id
    Identifier for the version of the target scene description for which the dynamic scene update is applicable result_version_id
    Identifier for the version of the resulting scene description when the dynamic scene update is applied return_event
    Flag to indicate whether the scene graph version is returned after the event playout. When set to a value '1', this flag may indicate that the scene graph version is returned to the version previous to the event, after the playout of the scene graph version triggered by the event scene update.
    For an event with operation 1 (902), this flag may be set to a value '0'.

Figure 10:
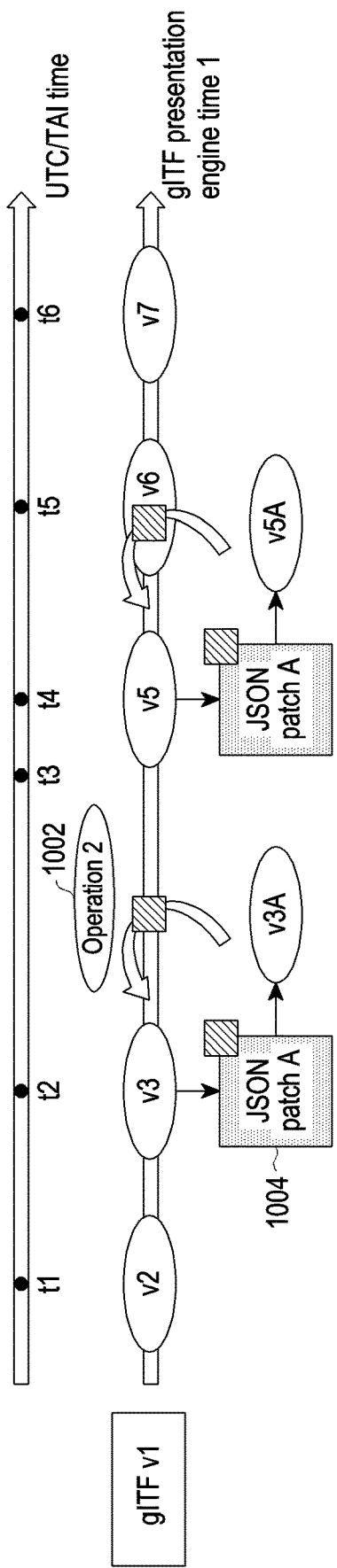
FIG. 10 shows an example of the required metadata (attributes) for the event scene update for operation 2 according to an embodiment of the disclosure.

FIG. 10 shows an example of the required metadata (attributes) for the event scene update for operation 2 according to an embodiment of the disclosure.

Referring to FIG. 10, to indicate the operation 2 (1002) (e.g., operation 2 (804)), the following metadata (including attributes) may be attached to the event scene update data (e.g., JSON patch A 1004 in FIG. 10). Multiple sets of these metadata (including attributes) may be present for a single copy of the event scene update data in order to avoid redundancy of the update data (e.g., JSON Patch A 1004).

event_id
    Identifier for the event triggering the dynamic scene update (e.g., triggering the JSON Patch A 1004)

target_version_id
    Identifier for the version of the target scene description for which the dynamic scene update is applicable result_version_id
    Identifier for the version of the resulting scene description when the dynamic scene update is applied return_event
    Flag to indicate whether the scene graph version is returned after the event scene playout. When set to a value '1', this flag may indicate that the scene graph version is returned to the version previous to the event, after the playout of the scene graph version triggered by the event scene update.
    For an event with operation 2 (1002), this flag may be set to a value '1'.

return_time
    may specify the return to presentation time (of the timed media) within the scene graph version indicated by the target_version_id upon return to the version after the event scene playout. The following return to operations can be signaled (are possible):
        Return to the beginning of the presentation time in the scene graph version
        Return to the presentation time (in the scene graph version) at which the event scene update was triggered (e.g., triggered by user interaction)
        Return to the presentation time (in the scene graph version) by calculating the passing of time for the event playout, indicated by playout_time, from the time at which the event scene update was triggered (e.g., if playout_time=5 seconds, then the scene presentation engine returns to the presentation time 5 seconds after when the event scene update was triggered)
        Return to a specific presentation time (in the scene graph version) which is explicitly signaled/indicated (e.g., presentation t=10 seconds)

playout_time
    may specify the playout time of the updated scene graph version triggered by the event scene update (in seconds, or any other time unit)

Figure 11:
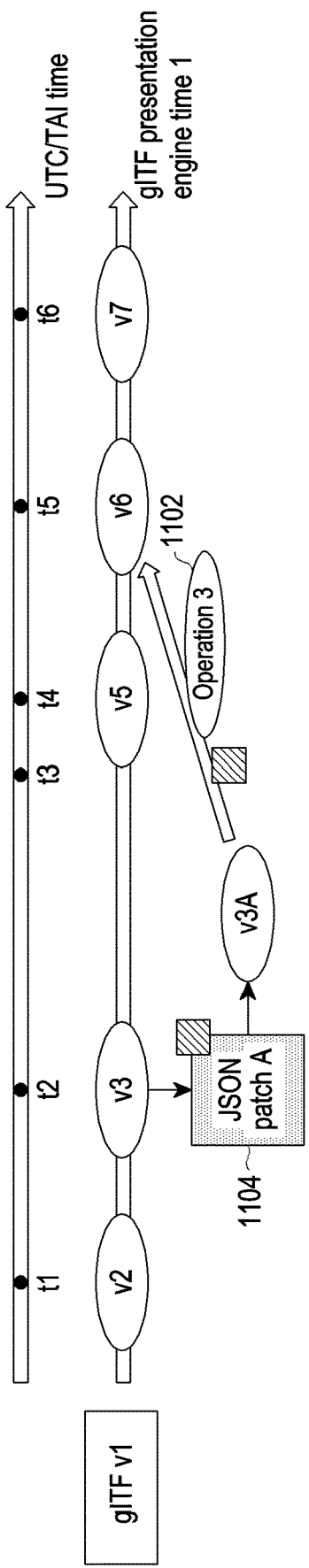
FIG. 11 shows an example of the required metadata (attributes) for the event scene update for operation 3 according to an embodiment of the disclosure.

FIG. 11 shows an example of the required metadata (attributes) for the event scene update for operation 3 according to an embodiment of the disclosure.

Referring to FIG. 11, to indicate the operation 3 (1102) (e.g., operation 3 (806)), the following metadata (including attributes) may be attached to the event scene update data (e.g., JSON patch A 1104 in FIG. 11). Multiple sets of these metadata (including attributes) may be present for a single copy of the event scene update data in order to avoid redundancy of the update data (e.g., JSON Patch A 1104).

event_id
    Identifier for the event triggering the dynamic scene update (e.g., triggering the JSON Patch A 1104)

target_version_id
    Identifier for the version of the target scene description for which the dynamic scene update is applicable result_version_id
    Identifier for the version of the resulting scene description when the dynamic scene update is applied return_event
    Flag to indicate whether the scene graph version is returned after the event scene playout. When set to a value '1', this flag may indicate that the scene graph version is returned to the version previous to the event, after the playout of the scene graph version triggered by the event scene update.

Figure 12:
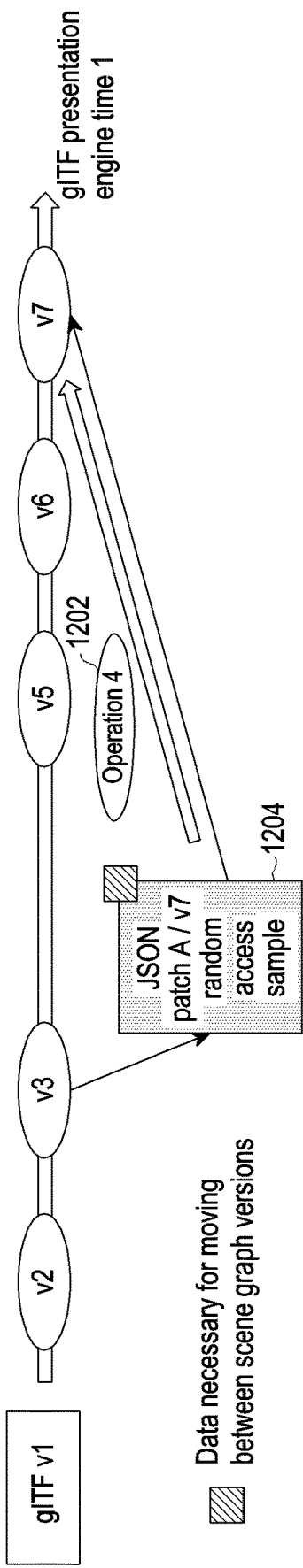
FIG. 12 shows an example of the required metadata (attributes) for the event scene skip for operation 4 according to an embodiment of the disclosure.

For an event with operation 3 (1102), this flag may be set to a value '0'.

goto_time
    may specify the go to presentation time (of the timed media) within the scene graph version indicated by the goto_version_id upon skip to the version after the event scene playout. The following go to operations may be signaled (are possible):
        Go to the beginning of the presentation time in the scene graph version
        Go to the presentation time (in the scene graph version) by calculating the passing of time for the event playout, indicated by playout_time, from the time at which the event scene update was triggered (e.g., if playout_time=5 seconds, then the scene presentation engine returns to the presentation time 5 seconds after when the event scene update was triggered)
        Go to a specific presentation time (in the scene graph version) which is explicitly signaled/indicated (e.g., presentation t=10 seconds)

playout_time
    may specify the playout time of the updated scene graph version triggered by the event scene update (in seconds, or any other time unit)

skip_version_id
    Identifier for the version of the skip to scene description which is executed/presented by the presentation engine, after the playout of the event updated scene graph skip_time
    may specify the skip to time (referenced to the presentation time) of the scene graph version to skip to by the presentation engine, after the playout of the event updated scene graph In one embodiment, the goto_time and the return_time may be fused into a single syntax FIG. 12 shows an example of the required metadata (attributes) for the event scene skip for operation 4 according to an embodiment of the disclosure.

Figure 13:
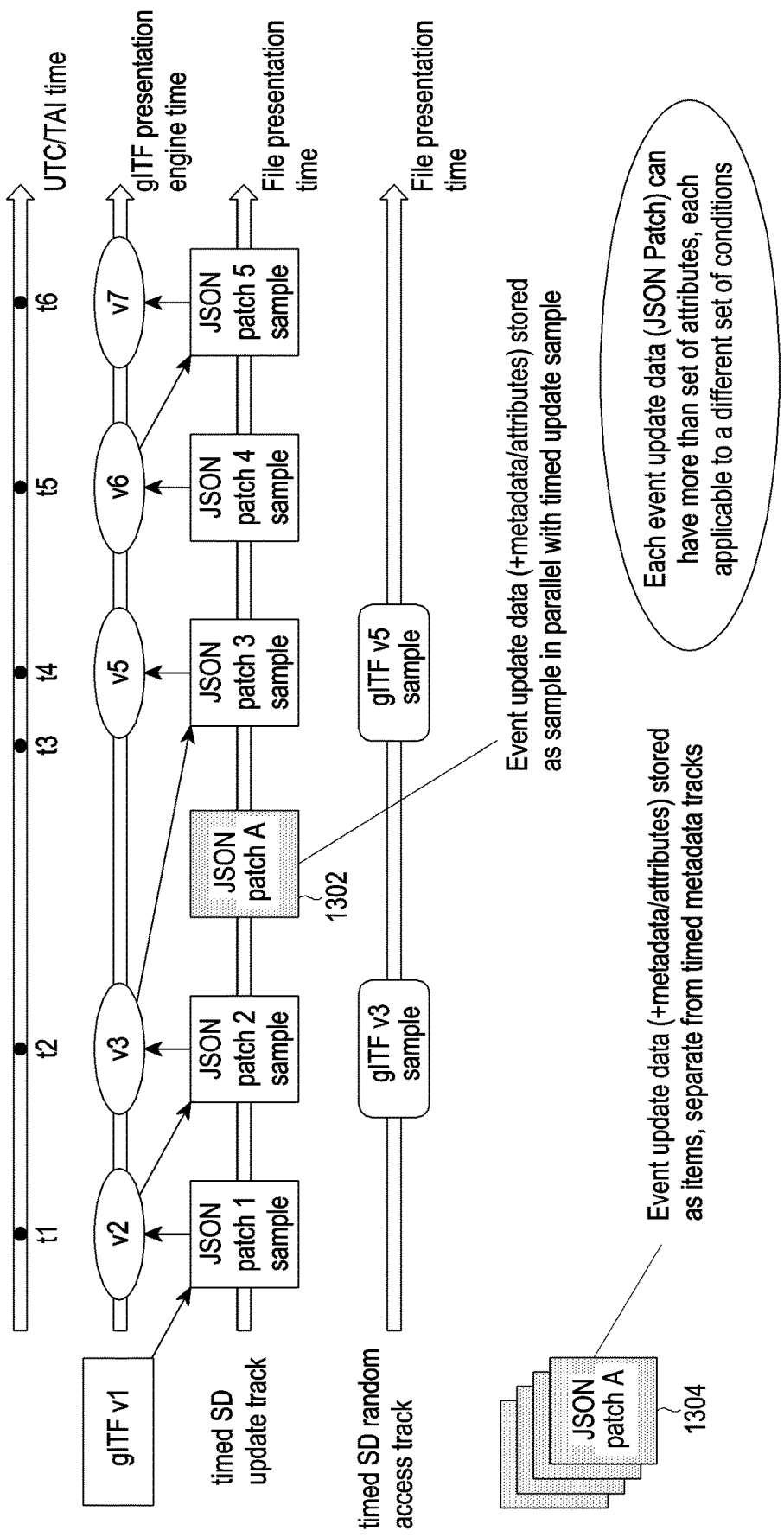
FIG. 13 shows the two different possibilities for the storage of event scene update data, together with the metadata/attributes according to an embodiment of the disclosure.

Referring to FIG. 12, to indicate the operation 4 (1202) (e.g., operation 4 (814)), the following metadata (including attributes) may be attached to the event scene skip data (e.g., JSON patch A/v7 random access scene graph sample 1204 in FIG. 12). Multiple sets of these metadata (including attributes) may be present for a single copy of the event scene skip data in order to avoid redundancy of the skip data (e.g., JSON Patch A/v7 random access scene graph sample 1204).

event_id
    Identifier for the event triggering the dynamic scene skip (e.g., triggering the JSON Patch or random access 1204 skip)

target_version_id
    Identifier for the version of the target scene description for which the dynamic scene skip is applicable result_version_id
    Identifier for the version of the resulting scene description when the dynamic scene skip is applied
    When both result_version_id and skip_version_id are present, for operation 4 (1202), their values may be the identical return_event
    Flag to indicate whether the scene graph version is returned after the event scene playout. When set to a value '1', this flag may indicate that the scene graph version is returned to the version previous to the event, after the playout of the scene graph version triggered by the event scene update.
    For an event with operation 4 (1202), this flag may be set to a value '0' (if present)

goto_time
    may specify the go to presentation time (of the timed media) within the scene graph version indicated by the goto_version_id/skip_version_id upon skip to the version after the event scene skip. The following go to operations can be signaled (are possible):
        Go to the beginning of the presentation time in the scene graph version
        Go to a specific presentation time (in the scene graph version) which is explicitly signaled/indicated (e.g., presentation t=10 seconds)

skip_version_id
    Identifier for the version of the skip to scene description which is executed/presented by the presentation engine, when the dynamic scene skip is applied
    When both result_version_id and skip_version_id are present, for operation 4, their values may be the identical skip_time
    may specify the skip to time (referenced to the presentation time) of the scene graph version to skip to by the presentation engine, when the dynamic scene skip is applied In one embodiment, the goto_time and the return_time may be fused into a single syntax, depending on the use case FIG. 13 shows the two different possibilities for the storage of event scene update data, together with the metadata/attributes according to an embodiment of the disclosure.

In an embodiment, event scene update data (+attributes) (e.g., JSON patch A 1302) may be stored as samples in parallel in a timed metadata track, together with time triggered scene update samples. When stored in a timed-metadata track as samples, event scene update samples may contain sample timestamps which indicate that they are "active." Normally, samples are "active" until the parsing of the next sample at its timestamp, but since in this case there are a combination of timed scene update samples and also event scene update samples, depending on the implementation, the "activeness" of an event scene update sample may for example be considered independent from the timed scene update samples.

In an embodiment, Event scene update data (+attributes) (e.g., JSON patch A 1304) may be stored as items, without any timestamps. Since the attributes contained with these event scene update data may contain constraints such as target and result IDs, the event updates may be "active" (relevant) when the resulting scene description IDs are met.

For each set of scene update data (JSON patch A 1302 or 1304), there may be a multiple set of event related attributes attached to the data. One such example is the JSON patch (e.g., JSON patch A 1004) in FIG. 10. Since the actual scene update data (JSON Patch A) required is the same, this data may be not required to be repeated (hence reducing redundancy), and may be instead associated with 2 different sets of attribute metadata; one corresponding to (v3, v3A), and one corresponding to (v5, v5A).

Attributes Summary
    Defined in the embodiments in this disclosure, for:
Timed Scene Update Sample Attributes
    Track sample presentation time (defined in sample of file format)
    target_version_id result_version_id
    absolute_time_UTC
    absolute_time_TAI
    execution_time
    execution_time_offset
(Timed) Scene Random Access Sample Attributes
    Track sample presentation time (defined in sample of file format)
    version_id
    absolute_time_UTC
    absolute_time_TAI
    execution_time
    execution_time_offset
Event Scene Update Data (Sample/Item) Attributes
    event_id
    target_version_id
    result_version_id
    return_event
    return_time/goto_time
    playout_time
    skip_version_id
    skip_time Depending on the use case, and desired operation, not all attributes are deemed mandatory.

The semantics for the corresponding attribute (syntax) is described in FIGS. 5-11.

Figure 14:
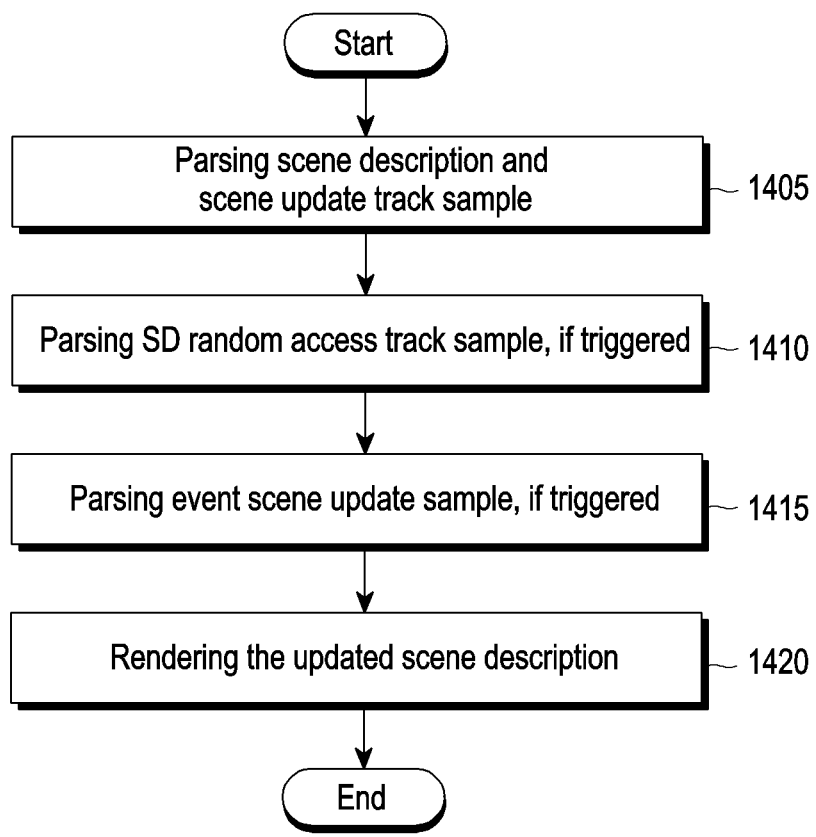
FIG. 14 shows the flowchart for dynamic scene updates according to an embodiment of the disclosure.

FIG. 14 shows the flowchart for dynamic scene updates according to an embodiment of the disclosure.

Referring to FIG. 14, in operation 1405, the device having the scene graph presentation engine may parse the initial scene description and at least one scene update track sample in timed-metadata track (or at least one scene update item) to generate the updated scene description according to at least one of embodiments shown in FIGS. 4 to 13. In operation 1410, the device may parse at least one SD random access track sample in timed metadata track, in response to random access triggered. In operation 1415, the device may parse at least one event scene update sample (or can be at least one event scene update item), in response to event-triggered. If the event scene update data and the metadata are not stored in the timed metadata track, then they are stored as the event scene update item, without any timestamp, as mentioned in FIG. 13. In operation 1420, the device may render the updated scene description on the display based on the parsing.

Figure 15:
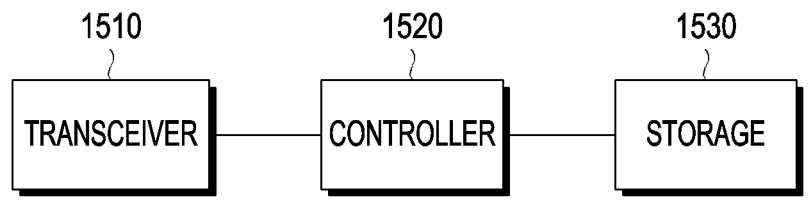
FIG. 15 shows a block diagram of a device according to an embodiment of the disclosure.

FIG. 15 shows a block diagram of a device according to an embodiment of the disclosure. The device may be the 5G UE comprising the scene presentation engine.

Referring to FIG. 15, the device may include a transceiver 1510, a controller 1520, and a storage 1530. In the embodiments in the disclosure, the controller 1520 may include a circuit, an application specific integrated circuit (ASIC), or at least one processor.

The transceiver 1510 may transmit and receive signals to and from a terminal or another entity.

The controller 1520 may control the overall operation of the entity according to the embodiments. For example, the controller 1520 may comprise the scene presentation engine to perform the embodiments in FIGS. 5-13 described above. For example, the controller 1520 may parse the initial scene graph and the scene update track sample(s). If present, the controller 1520 may parse the scene description random access track sample. If present, the controller 1520 may parse the event scene update sample.

The storage 1530 may store at least one of information exchanged through the transceiver 1510 and information generated by the controller 1530.

In one embodiment, a method for timed and event triggered updates in a scene description for extended reality (XR) multimedia is disclosed. The method comprises: parsing a scene description and at least one scene update track sample in a timed scene description update track or at least one scene update item to update the scene description; and rendering the updated scene description on a display.

In one embodiment, the scene update track sample may comprise at least one of: data for scene graph update of the scene description; metadata related to the scene graph update describing operations and/or conditions related to the scene graph update; and a timestamp for the scene update track sample, according to a presentation timeline of the timed scene description update track.

In one embodiment, the metadata may comprise at least one of: a track sample presentation time; a presentation time of the data for scene graph update stored as the scene update track sample in the timed scene description update track; a target_version_id comprising an identifier for a version of a target scene description for which a dynamic scene update is applicable; result_version_id comprising an identifier for a version of a resulting scene description after the dynamic scene update is applied; and an absolute_time_UTC identifying an execution time of a scene update transaction on the updated scene description; an absolute_time_TAI identifying an execution time of a scene update transaction on the updated scene description; an execution_time identifying an execution time of a scene update transaction on the updated scene description referenced to the track sample presentation time of the timed scene description update track; and an execution_time_offset identifying time offset for an execution time of a scene update transaction on the updated scene description calculated from the timestamp.

In one embodiment, the method further comprises: parsing at least one timed scene description random access track sample in a timed scene description random access track to update the scene description.

In one embodiment, the timed scene description random access track sample comprises at least one of: data for random access of the scene description; metadata related to a version number of the scene description, and/or conditions of a presentation time; and a timestamp for the timed scene description random access track sample, according to a presentation timeline of the timed scene description random access track.

In one embodiment, the metadata may comprise at least one of: a track sample presentation time identifying a presentation time of the data for random access of the scene description stored as the scene description random access sample in the timed scene description random access track; a version_id comprising an identifier for a version of the updated scene description contained inside the scene description random access sample; an absolute_time_UTC identifying an execution time of the updated scene description; an absolute_time_TAI identifying an execution time of the updated scene description; an execution_time identifying an execution time of the updated scene description referenced to the track sample presentation time; and an execution_time_offset comprising time offset for an execution time of the updated scene description calculated from the timestamp.

In one embodiment, the method may further comprise: parsing at least one event scene update sample in a timed event scene update track or at least one event scene update item, in response to an event being triggered to update the scene description, wherein the event comprises at least one user interaction.

In one embodiment, the event scene update sample may comprise at least one of: an event_id comprising an identifier for the event triggering a dynamic scene update; a target_version_id comprising an identifier for a version of a target scene description for which the dynamic scene update is applicable; a result_version_id comprising an identifier for a version of a resulting scene description after the dynamic scene update is applied; and a return_event comprising a flag to indicate whether a version of the scene description is returned after the event playout.

In one embodiment, the event scene update sample may comprise at least one of: an event_id comprising an identifier for the event triggering a dynamic scene update; a target_version_id comprising an identifier for a version of a target scene description for which the dynamic scene update is applicable; a result_version_id comprising an identifier for a version of a resulting scene description after the dynamic scene update is applied; a return_event comprising a flag to indicate whether a version of the scene description is returned after the event playout; a return_time specifying a return to presentation time within the scene description having a version indicated by the target_version_id upon return to the version after the event playout; and a playout_time specifying a playout time of the updated scene description triggered by the event.

In one embodiment, the event scene update sample may comprise at least one of: an event_id comprising an identifier for the event triggering a dynamic scene update; a target_version_id comprising an identifier for a version of a target scene description for which the dynamic scene update is applicable; a result_version_id comprising an identifier for a version of a resulting scene description after the dynamic scene update is applied; a return_event comprising a flag to indicate whether a version of the scene description is returned after the event playout; a goto_time specifying a presentation time to go within the scene description having a version indicated by a goto_version_id upon skip to a version after the event playout; a playout_time specifying playout time of the updated scene description having a version triggered by the event; a skip_version_id comprising an identifier for a version to skip to a scene description which is presented, after playout of the event; and a skip_time specifying a time to skip of the scene description having a version to skip, after playout of the event.

In one embodiment, the event scene update sample may comprise at least one of: an event_id comprising an identifier for the event triggering a dynamic scene update; a target_version_id comprising an identifier for a version of a target scene description for which the dynamic scene update is applicable; a result_version_id comprising an identifier for a version of a resulting scene description after the dynamic scene update is applied; a return_event comprising a flag to indicate whether a version of the scene description is returned after the event playout; a skip_version_id comprising an identifier for a version to skip to a scene description which is presented, after playout of the event; and a skip_time specifying a time to skip of the scene description having a version to skip, after playout of the event.

In one embodiment, a device for timed and event triggered updates in a scene description for extended reality (XR) multimedia, comprising: a transceiver; and a controller coupled with the transceiver and configured to perform one of the above embodiments.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a device for timed and event triggered updates in a scene description for extended reality (XR) multimedia, the method comprising:
parsing a scene description and at least one scene update track sample in a timed scene description update metadata track;
updating the scene description based on the parsing; and
rendering the updated scene description on a display,
wherein the at least one scene update track sample comprises metadata related to a scene graph update describing operations or conditions related to the scene graph update, and wherein the metadata comprises at least one of:
  a presentation time of data for scene graph update stored as the at least one scene update track sample in the timed scene description update metadata track;
  a target_version_id comprising an identifier for a version of a target scene description for which a dynamic scene update is applicable;
  a result_version_id comprising an identifier for a version of a resulting scene description after the dynamic scene update is applied; and
  an execution_time_offset identifying time offset for an execution time of a scene update transaction on the updated scene description calculated from a timestamp for the at least one scene update track sample.

2. The method of claim 1, wherein the at least one scene update track sample further comprises at least one of:
  data for a scene graph update of the scene description; or
  a timestamp for the at least one scene update track sample, according to a presentation timeline of the timed scene description update metadata track.

3. The method of claim 2, wherein the metadata further comprises at least one of:
  a track sample presentation time;
  an absolute_time_UTC identifying an execution time of a scene update transaction on the updated scene description;
  an absolute_time_TAI identifying an execution time of a scene update transaction on the updated scene description; or
  an execution_time identifying an execution time of a scene update transaction on the updated scene description referenced to the track sample presentation time of the timed scene description update metadata track.

4. The method of claim 1, further comprising:
  parsing at least one timed scene description random access track sample in a timed scene description random access track to update the scene description.

5. The method of claim 4, wherein the at least one timed scene description random access track sample comprises at least one of:
  data for random access of the scene description;
  metadata related to a version number of the scene description, or conditions of a presentation time; or
  a timestamp for the at least one timed scene description random access track sample, according to a presentation timeline of the timed scene description random access track.

6. The method of claim 5, wherein the metadata comprises at least one of:
  a track sample presentation time identifying a presentation time of the data for random access of the scene description stored as a scene description random access sample in the timed scene description random access track;
  a version_id comprising an identifier for a version of the updated scene description contained inside the scene description random access sample;
  an absolute_time_UTC identifying an execution time of the updated scene description;
  an absolute_time_TAI identifying an execution time of the updated scene description;
  an execution_time identifying an execution time of the updated scene description referenced to the track sample presentation time; or
  an execution_time_offset comprising time offset for an execution time of the updated scene description calculated from the timestamp for the at least one timed scene description random access track sample.

7. The method of claim 1, further comprising:
  parsing at least one event scene update sample in a timed event scene update track or at least one event scene update item, in response to an event being triggered to update the scene description,
  wherein the event comprises at least one user interaction.

8. The method of claim 7, wherein the event scene update sample comprises at least one of:
  an event_id comprising an identifier for an event triggering a dynamic scene update;
  a target_version_id comprising an identifier for a version of a target scene description for which the dynamic scene update is applicable;
  a result_version_id comprising an identifier for a version of a resulting scene description after the dynamic scene update is applied; or
  a return_event comprising a flag indicating whether a version of the scene description is returned after playout of the event.

9. The method of claim 7, wherein the event scene update sample comprises at least one of:
  an event_id comprising an identifier for an event triggering a dynamic scene update;
  a target_version_id comprising an identifier for a version of a target scene description for which the dynamic scene update is applicable;
  a result_version_id comprising an identifier for a version of a resulting scene description after the dynamic scene update is applied;
  a return_event comprising a flag to indicate whether a version of the scene description is returned after an event of playout;
  a return_time specifying a return to presentation time within the scene description having a version indicated by the target_version_id upon return to the version after playout of the event; or
  a playout_time specifying a playout time of the updated scene description triggered by the event.

10. The method of claim 7, wherein the event scene update sample comprises at least one of:
  an event_id comprising an identifier for an event triggering a dynamic scene update;
  a target_version_id comprising an identifier for a version of a target scene description for which the dynamic scene update is applicable;
  a result_version_id comprising an identifier for a version of a resulting scene description after the dynamic scene update is applied;
  a return_event comprising a flag to indicate whether a version of the scene description is returned after an event of playout;
  a goto_time specifying a presentation time to go within the scene description having a version indicated by a goto_version_id upon skip to a version after an event of playout;
  a playout_time specifying playout time of the updated scene description having a version triggered by the event;
  a skip_version_id comprising an identifier for a version to skip to a scene description which is presented, after playout of the event; or
  a skip_time specifying a time to skip of the scene description having a version to skip, after playout of the event.

11. The method of claim 7, wherein the event scene update sample comprises at least one of:

an event_id comprising an identifier for an event triggering a dynamic scene update;
a target_version_id comprising an identifier for a version of a target scene description for which the dynamic scene update is applicable;
a result_version_id comprising an identifier for a version of a resulting scene description after the dynamic scene update is applied;
a return_event comprising a flag to indicate whether a version of the scene description is returned after an event of playout;
a skip_version_id comprising an identifier for a version to skip to a scene description which is presented, after an event of playout; or
a skip_time specifying a time to skip of the scene description having a version to skip, after an event of playout.

12. A device for timed and event triggered updates in a scene description for extended reality (XR) multimedia, the device comprising:
a transceiver; and
a controller coupled with the transceiver and being configured to:
parse a scene description and at least one scene update track sample in a timed scene description update metadata track or at least one scene update item,
update the scene description based on the parsing, and
render the updated scene description on a display,
wherein the at least one scene update track sample comprises metadata related to a scene graph update describing operations or conditions related to the scene graph update, and
wherein the metadata comprises at least one of:
a presentation time of data for scene graph update stored as the at least one scene update track sample in the timed scene description update metadata track;
a target_version_id comprising an identifier for a version of a target scene description for which a dynamic scene update is applicable;
a result_version_id comprising an identifier for a version of a resulting scene description after the dynamic scene update is applied; and
an execution_time_offset identifying time offset for an execution time of a scene update transaction on the updated scene description calculated from a timestamp for the at least one scene update track sample.

13. The device of claim 12, wherein the at least one scene update track sample further comprises at least one of:
data for a scene graph update of the scene description; or
a timestamp for the at least one scene update track sample, according to a presentation timeline of the timed scene description update metadata track.

14. The device of claim 13, wherein the metadata further comprises at least one of:
a track sample presentation time;
an absolute_time_UTC identifying an execution time of a scene update transaction on the updated scene description;
an absolute_time_TAI identifying an execution time of a scene update transaction on the updated scene description; or
an execution_time identifying an execution time of a scene update transaction on the updated scene description referenced to the track sample presentation time of the timed scene description update metadata track.

15. The device of claim 12, wherein the controller is further configured to:
parse at least one timed scene description random access track sample in a timed scene description random access track to update the scene description.

16. The device of claim 15, wherein the at least one timed scene description random access track sample comprises at least one of:
data for random access of the scene description;
metadata related to a version number of the scene description, or conditions of a presentation time; or
a timestamp for the at least one timed scene description random access track sample, according to a presentation timeline of the timed scene description random access track.

17. The device of claim 16, wherein the metadata comprises at least one of:
a track sample presentation time identifying a presentation time of the data for random access of the scene description stored as a scene description random access sample in the timed scene description random access track;
a version_id comprising an identifier for a version of the updated scene description contained inside the scene description random access sample;
an absolute_time_UTC identifying an execution time of the updated scene description;
an absolute_time_TAI identifying an execution time of the updated scene description;
an execution_time identifying an execution time of the updated scene description referenced to the track sample presentation time; or
an execution_time_offset comprising time offset for an execution time of the updated scene description calculated from the timestamp for the at least one timed scene description random access track sample.

18. The device of claim 12,
wherein the controller is further configured to:
parse at least one event scene update sample in a timed event scene update track or at least one event scene update item, in response to an event being triggered to update the scene description, and
wherein the event comprises at least one user interaction.

19. The device of claim 18, wherein the event scene update sample comprises at least one of:
an event_id comprising an identifier for an event triggering a dynamic scene update;
a target_version_id comprising an identifier for a version of a target scene description for which the dynamic scene update is applicable;
a result_version_id comprising an identifier for a version of a resulting scene description after the dynamic scene update is applied; or
a return_event comprising a flag indicating whether a version of the scene description is returned after an event of playout.

20. The device of claim 18, wherein the event scene update sample comprises at least one of:
an event_id comprising an identifier for an event triggering a dynamic scene update;
a target_version_id comprising an identifier for a version of a target scene description for which the dynamic scene update is applicable;
a result_version_id comprising an identifier for a version of a resulting scene description after the dynamic scene update is applied;
a return_event comprising a flag to indicate whether a version of the scene description is returned after an event of playout;

a return_time specifying a return to presentation time within the scene description having a version indicated by the target_version_id upon return to the version after an event of playout; or a playout_time specifying a playout time of the updated scene description triggered by the event.

\* \* \* \* \*